(12) United States Patent
Kajiwara et al.

(10) Patent No.: US 8,439,142 B2
(45) Date of Patent: May 14, 2013

(54) STRADDLE TYPE VEHICLE

(75) Inventors: Kenichi Kajiwara, Shizuoka (JP);
Kazuya Nishizawa, Shizuoka (JP);
Takayuki Gouke, Shizuoka (JP);
Takeshi Igarashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 677 days.

(21) Appl. No.: 11/951,220

(22) Filed: Dec. 5, 2007

(65) Prior Publication Data
US 2008/0135317 A1 Jun. 12, 2008

(30) Foreign Application Priority Data
Dec. 6, 2006 (JP) ................................. 2006-330004

(51) Int. Cl.
*B60K 13/02* (2006.01)
*B60K 13/04* (2006.01)

(52) U.S. Cl.
USPC ......................................... 180/68.3; 180/309

(58) Field of Classification Search .................. 180/309, 180/68.3, 68.2, 219, 226, 296
See application file for complete search history.

(56) References Cited

U.S. PATENT DOCUMENTS

| | | | | |
|---|---|---|---|---|
| 3,061,416 A * | 10/1962 | Kazokas | ........................ | 422/176 |
| 3,672,172 A * | 6/1972 | Hammond | ...................... | 60/282 |
| 3,969,082 A * | 7/1976 | Cairns et al. | ................... | 422/180 |
| 4,085,586 A * | 4/1978 | Shibata | ........................... | 60/277 |
| 4,450,683 A * | 5/1984 | Ikenoya et al. | ................. | 60/290 |
| 5,197,282 A * | 3/1993 | Kume | ............................... | 60/307 |
| 5,396,767 A | 3/1995 | Suzuki | | |
| 5,657,628 A * | 8/1997 | Takeuchi | ......................... | 60/293 |
| 5,735,121 A * | 4/1998 | Kato et al. | ...................... | 60/277 |
| 6,192,678 B1 * | 2/2001 | Tachibana | ....................... | 60/289 |
| 6,250,076 B1 * | 6/2001 | Kawamata et al. | ............. | 60/304 |
| 6,612,885 B2 | 9/2003 | Yamazaki et al. | | |
| 6,966,177 B2 * | 11/2005 | Koyama et al. | ................. | 60/277 |
| 7,252,172 B2 * | 8/2007 | Miyakozawa et al. | ........ | 180/291 |
| 7,263,826 B2 * | 9/2007 | Wu | ................................. | 60/299 |
| 2002/0065007 A1 | 5/2002 | Yamazaki et al. | | |
| 2006/0101813 A1 * | 5/2006 | Wu | ................................. | 60/299 |
| 2006/0150617 A1 * | 7/2006 | Nishimura et al. | ............. | 60/289 |

FOREIGN PATENT DOCUMENTS

| | | |
|---|---|---|
| EP | 1749988 A1 | 2/2007 |
| FR | 2827908 A1 | 1/2003 |
| JP | 57041416 A | 3/1982 |
| JP | 2001-130474 | 5/2001 |
| JP | 2006226262 A | 8/2006 |

OTHER PUBLICATIONS

European Search Report for corresponding European application No. 07023188.1.

* cited by examiner

*Primary Examiner* — Frank Vanaman
(74) *Attorney, Agent, or Firm* — Keating & Bennett, LLP (57) ABSTRACT

Air flowing through a secondary air inducting conduit of a motorcycle is effectively cooled to enhance combustion efficiency of exhaust gas in a catalyzer. A part of the secondary air inducting conduit is exposed to a space behind a front wheel and in front of an engine, and thus acts as a secondary air cooling conduit section for cooling down secondary air flowing through the secondary air inducting conduit.

9 Claims, 9 Drawing Sheets

STRADDLE TYPE VEHICLE

RELATED APPLICATIONS

This application claims the benefit of priority under 35 USC 119 of Japanese patent application no. 2006-330004, filed on Dec. 6, 2006, which application is hereby incorporated by reference in its entirety.

BACKGROUND OF THE INVENTION

1. Field of the Invention

The present invention relates to a straddle type vehicle such as a motorcycle.

2. Description of Related Art

Usually, exhaust gas from an engine of a straddle type vehicle is emitted to the air. The exhaust gas should be purified as much as possible before emission to the air. Therefore, a catalytic converter (catalyzer) is conventionally provided midway in an exhaust conduit through which exhaust gas is emitted to carry out purification (for example, see JP-A-2001-130474).

In the conventional art, to effectively purify exhaust gas, a secondary air inducting conduit is mounted upstream of the catalyzer, and outside (secondary) air is inducted from the secondary air inducting conduit through the exhaust conduit to the catalyzer. Combustion efficiency of exhaust gas is thereby enhanced by passing secondary air through the catalyzer.

However, in the conventional art, the secondary air inducting conduit extends downward from an air cleaner toward the exhaust conduit and is covered from the front and the side by a vehicle cover. The vehicle cover hinders high temperature heat from being emitted outside, and the high temperature heat is therefore apt to directly transmit to the secondary air inducting conduit.

As a result, there is a problem that oxygen in secondary air flowing through the secondary air inducting conduit expands due to heat from the engine, which lowers oxygen concentration lowers and makes it difficult to enhance combustion efficiency of the exhaust gas by secondary air in the catalyzer.

SUMMARY OF THE INVENTION

The present invention is made in consideration of this problem, and provides a straddle type vehicle in which oxygen in air flowing through a secondary air inducting conduit is effectively cooled down, and combustion efficiency of exhaust gas by secondary air in a catalyzer is enhanced.

A straddle type vehicle according to the present invention includes an engine disposed between a front wheel and a rear wheel. A front catalytic converter and a rear catalytic converter are spaced apart in an exhaust conduit of the engine. A secondary air inducting conduit has a downstream end connected to the exhaust conduit between the front catalytic converter and the rear catalytic converter. The secondary air inducting conduit includes a secondary air cooling conduit section exposed in at least either forward or sideward directions behind the front wheel.

According to this construction, the secondary air cooling conduit section is exposed in at least either forward or sideward directions behind the front wheel. Thus, the secondary air cooling conduit section is effectively cooled down, and the oxygen concentration of secondary air flowing through the secondary air cooling conduit section is increased. Combustion efficiency of exhaust gas by the secondary air is thereby enhanced when secondary air inducted from the secondary air inducting conduit to the exhaust conduit flows through the rear catalyzer.

In one embodiment of the invention, the secondary air cooling conduit section is forward of the engine. With such a construction, rearward hot air flow from the engine due to traveling does not contact the secondary air cooling conduit section. Thereby, the secondary air cooling conduit section is not affected by engine heat and is more efficiently cooled down.

In one embodiment of the invention, at least a part of an air cleaner is behind the engine, and an upstream end of the secondary air inducting conduit is connected to the air cleaner.

In one embodiment of the invention, the secondary air cooling conduit section is formed with a metal pipe. Since a metal pipe has high thermal conductivity, secondary air flowing through the secondary air cooling conduit section is more effectively cooled down.

In another embodiment of the invention, a part of the secondary air inducting conduit connected to the exhaust conduit is disposed below the engine, and the secondary air inducting conduit extends from this connection part in a horizontal direction below the engine. With such a construction, the secondary air inducting conduit is lengthened to extend upstream from the connection part to the exhaust conduit in the horizontal direction, and a sufficient length of inducting pipe is obtained to cool down secondary air flowing in the secondary air inducting conduit. Accordingly, secondary air is more efficiently cooled down.

In another embodiment of the invention, the secondary air inducting conduit extends from either one of the right side and the left side to an other side traversing a center of the vehicle. With such a construction, the entire length of the secondary air inducting conduit is enlarged, and secondary air flowing in the secondary air inducting conduit is sufficiently cooled down.

In another embodiment of the invention, at least a part of the secondary air inducting conduit overlaps the right and left frames in a side view. With such a construction, the right and left frames protect the secondary air inducting conduit from shocks from the outside and so forth.

The straddle type vehicle according to the present invention has a construction such that the secondary air cooling conduit section of the secondary air inducting conduit is exposed in at least either forward or sideward directions of the vehicle behind the front wheel. Thus, the oxygen concentration of secondary air flowing through the secondary air cooling conduit section is increased. Therefore, combustion efficiency of exhaust gas by secondary air inducted from the secondary air inducting conduit to the exhaust conduit and rear catalyzer is enhanced, and purification of exhaust gas by the rear catalyzer is assured.

Other features and advantages of the invention will be apparent from the following detailed description, taken in conjunction with the accompanying drawings which illustrate, by way of example, various features of embodiments of the invention.

DETAILED DESCRIPTION OF THE INVENTION

A straddle type vehicle according to a first embodiment of the present invention is described with reference to FIGS. 1-5, with application to a motorcycle 1 as an example. Motorcycle 1 includes a frame 10, an engine 20, an exhaust conduit 30, a front catalyzer 40, a rear catalyzer 50 and a secondary air inducting conduit 80.

Frame 10 includes a head pipe 11, and left and right frames 12 and 13 each having a general shape of a parallelogram.

Figure 1:
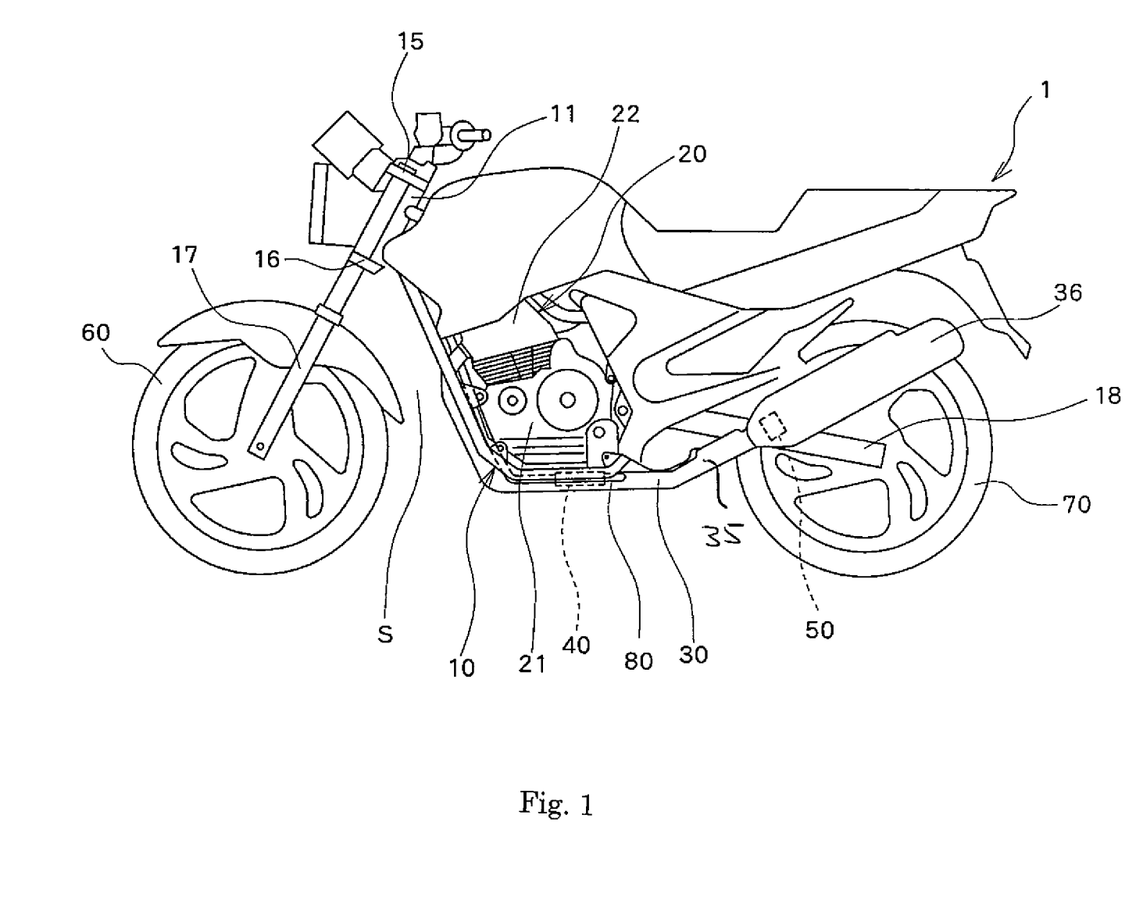
FIG. 1 is a side view of a motorcycle according to a first embodiment of the present invention.
Figure 2:
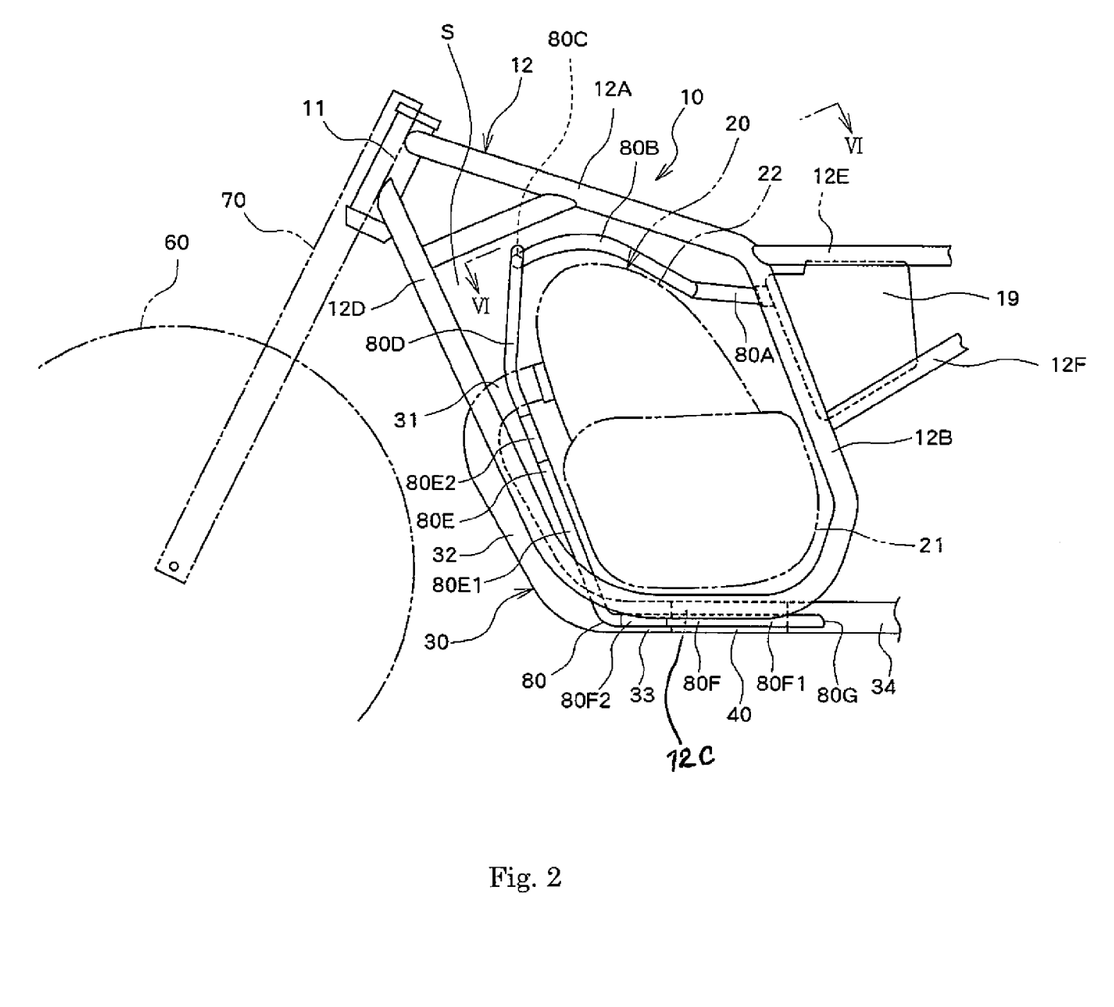
FIG. 2 is an enlarged partial side view of frames, an exhaust conduit and a secondary air inducting conduit of the motorcycle of FIG. 1.

As shown in FIG. 2, left frame 12 is connected to an upper end of head pipe 11 at its front end. Left frame 12 includes a first frame part 12A extending rearward and obliquely downward from head pipe 11; a second frame part 12B extending rearward and obliquely downward from a rear end of first frame part 12A, and curving in a dog leg shape to extend forward and obliquely downward at its lower end; a third frame part 12C extending forward from the lower end of second frame part 12B in a generally horizontal direction; and a fourth frame part 12D curvedly extending forward and obliquely upward from a front end of third frame part 12C and connected to a lower end of head pipe 11 at its upper end.

Figure 3:
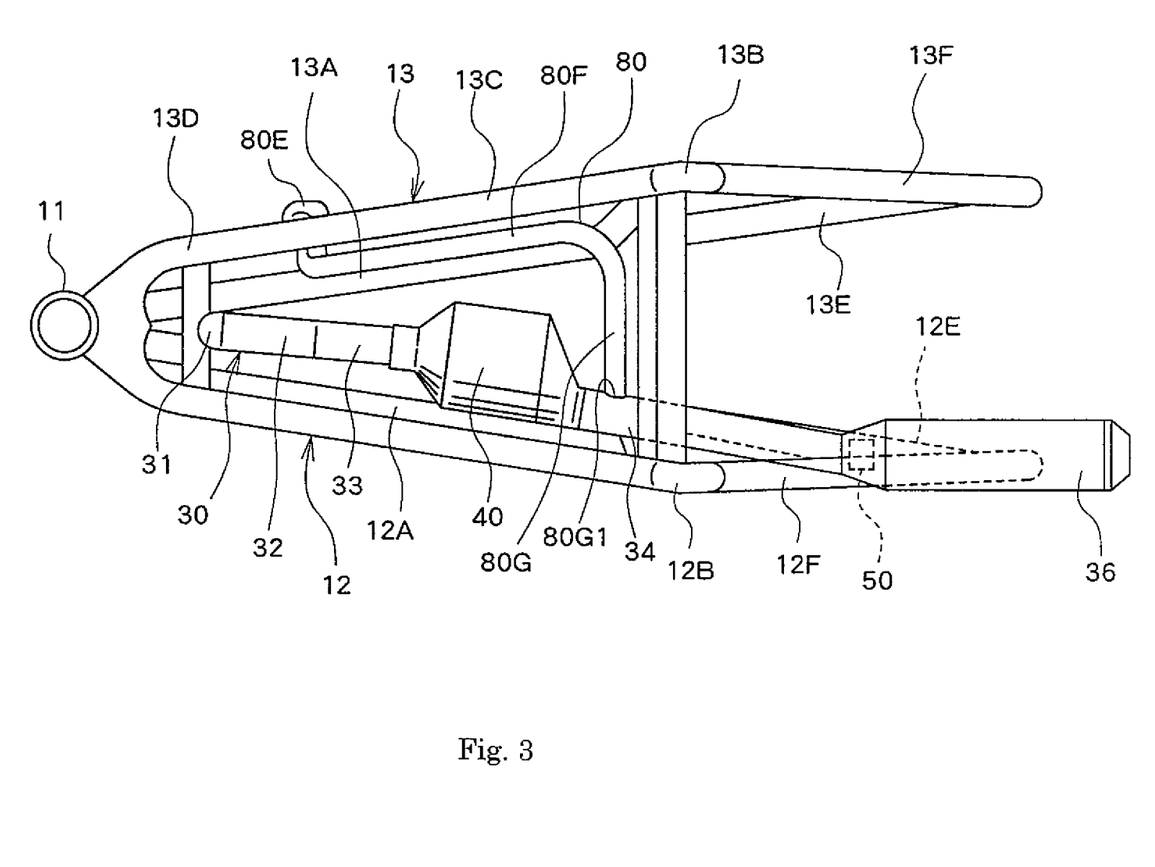
FIG. 3 is a bottom plan view of the frames, exhaust conduit and secondary air inducting conduit of FIG. 2.
Figure 4:
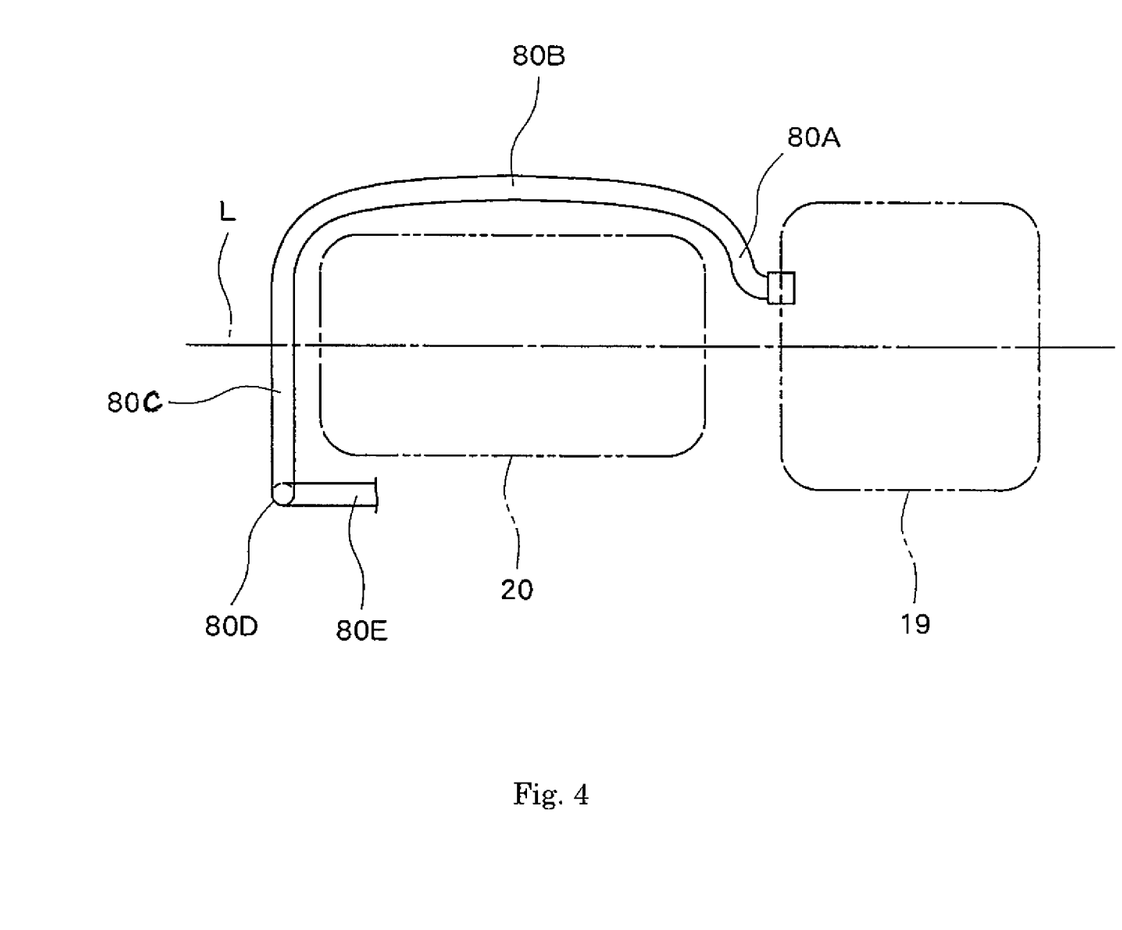
FIG. 4 is a plan view of the secondary air inducting conduit viewing in a direction of arrow VI-VI of FIG. 2.
Figure 5:
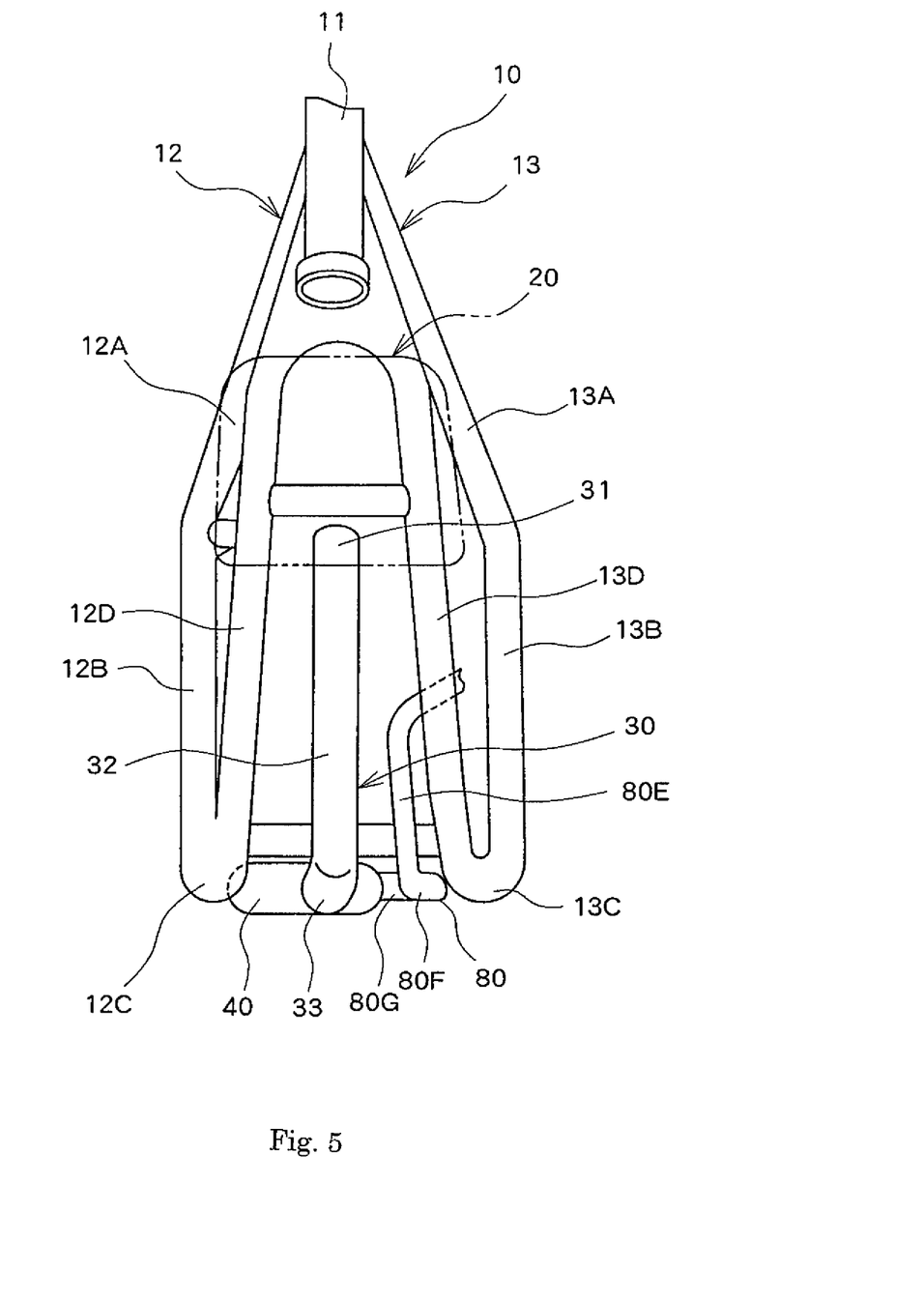
FIG. 5 is a front view of the frames, the exhaust conduit, a front catalyzer and the secondary air inducting conduit of FIG. 2.

Left frame 12 includes a seat rail 12E connected to a boundary part between first frame part 12A and second frame part 12B at its front end and extending rearward in a generally horizontal direction therefrom, and a backstay 12F extending at its front end rearward and obliquely upward from a middle part of second frame part 12B. Seat rail 12E is connected to a midway part of backstay 12F at its rear end. Similarly, as shown in FIGS. 3 and 5, right frame 13 includes a first frame part 13A, a second frame part 13B, a third frame part 13C, a fourth frame part 13D, a seat rail 13E and a backstay 13F.

A rotating shaft on handlebars 14 is rotatably fitted into head pipe 11. The rotating shaft of handlebars 14 is fixed to a middle part of an upper bracket 15 and a middle part of an under bracket 16. Parts around upper ends of left and right front forks 17 are inserted and fixed to left and right ends of brackets 15 and 16. A front wheel 60 is rotatably coupled to lower ends of front forks 17.

Front ends of a swing arm 18 are swingably coupled to and supported by second frame part 12B of left frame 12 and second frame part 13B of right frame 13. A rear wheel 70 is rotatably coupled to rear ends of swing arm 18.

An air cleaner 19 is disposed behind engine 20 between seat rail 12E and backstay 12F. Air cleaner 19 removes debris such as dust in air supplied to engine 20 and secondary air inducting conduit 80. Engine 20 is disposed inside and is suspended by frames 12 and 13. Engine 20 includes a crankcase 21 and a cylinder 22 on an upper part of crankcase 21.

As shown in FIGS. 2, 3 and 5, exhaust conduit 30 includes a first pipe 31 extending forward from cylinder 22 of engine 20 and curving in an arc shape; a second pipe 32 extending rearward and obliquely downward from first pipe 31; a third pipe 33 extending rearward from second pipe 32 in a generally horizontal direction and connected to front catalyzer 40; a fourth pipe 34 extending rearward from front catalyzer 40 in a generally horizontal direction; a fifth pipe 35 curvedly extending rearward and obliquely upward from fourth pipe 34; and a muffler 36 connected to fifth pipe 35. Exhaust conduit 30 discharges exhaust gas from engine 20 outside via front catalyzer 40, rear catalyzer 50 and muffler 36.

Front catalyzer 40 is disposed below crankcase 21 and between third pipe 33 and fourth pipe 34. Front catalyzer 40 is formed into a flat shape and has a width in a transverse direction larger than a height in a vertical direction. Therefore, front catalyzer 40 does not protrude below third pipe 33 and fourth pipe 34 and a minimum height of the vehicle body from the ground is thereby assured.

Rear catalyzer 50 is disposed in muffler 36 positioned downstream of front catalyzer 40. Front and rear catalyzers 40 and 50 facilitate combustion of deleterious elements (HC, NOx and so forth) in the exhaust gas, and thereby purify the exhaust gas.

Secondary air inducting conduit 80 inducts outside air passed through air cleaner 19 into rear catalyzer 50 via fourth pipe 34 of exhaust conduit 30, and enhances combustion efficiency of exhaust gas in rear catalyzer 50. Secondary air inducting conduit 80 is formed with a metal pipe, rubber hose or the like.

As shown in FIG. 2, secondary air inducting conduit 80 is connected to a front end of air cleaner 19 at its upstream end. Secondary air inducting conduit 80 includes a first conduit section 80A extending forward and obliquely rightward from air cleaner 19; a second conduit section SOB extending from first conduit section 80A and gradually curving in an arc shape above and to the right of cylinder 22; a third conduit section 80C extending from second conduit section 80B, which is on one (right) side, to the other (left) side and traversing the center line L of the vehicle (see FIG. 4) in front of cylinder 22; and a fourth conduit section 80D dropping from third conduit section 80C.

Secondary air inducting conduit 80 also includes a fifth conduit section 80E extending rearward and obliquely downward from fourth conduit section 80D, curving in a dog leg shape; a sixth conduit section 80F extending rearward from fifth conduit section 80E in a generally horizontal direction and curving in an L shape and partly overlapping third frame 12C of left frame 12 in a side view; and a seventh conduit section 80G (see FIG. 3) extending rightward from sixth conduit section 80F in the horizontal direction and curving in an arc shape, and having a downstream connection part 80G1 connected to fourth pipe 34 of exhaust conduit 30 positioned between front and rear catalyzers 40 and 50. Connection part 80G1 is disposed below crankcase 21.

As shown in FIG. 2, conduit sections 80C-80E are exposed to a space S formed between front wheel 60 and engine 20. Conduit sections 80C-80E are not covered by a vehicle cover or the like, and are visible from outside the front and side of motorcycle 1.

Conduit sections 80A, 80B, 80C, 80D, a lower part 80E1 of fifth conduit section 80E, a rear part 80F of sixth conduit section 80F, and conduit section SOG are formed with metal pipes. Thereby, secondary air flowing in these conduit sections is effectively cooled down. An upper part 80E2 of conduit section SOE and a front part 80F2 of conduit section 80F are formed with rubber hoses.

Therefore, secondary air flowing in secondary air inducting conduit 80 is cooled down from the outside by cold air in space S while passing through conduit sections 80C-80E.

Accordingly, conduit sections 80C-80E function as a secondary air cooling conduit section for cooling down secondary air.

According to this embodiment, conduit sections 80C-80E are exposed to space S behind front wheel 60 and forward of engine 20. Therefore, secondary air is cooled down by conduit sections 80C-80E, and oxygen concentration of the secondary air is increased. Combustion efficiency of the exhaust gas is thereby enhanced by the secondary air inducted from conduit 80 into exhaust conduit 30 and rear catalyzer 50, and rear catalyzer 50 effectively purifies the exhaust gas.

Figure 6:
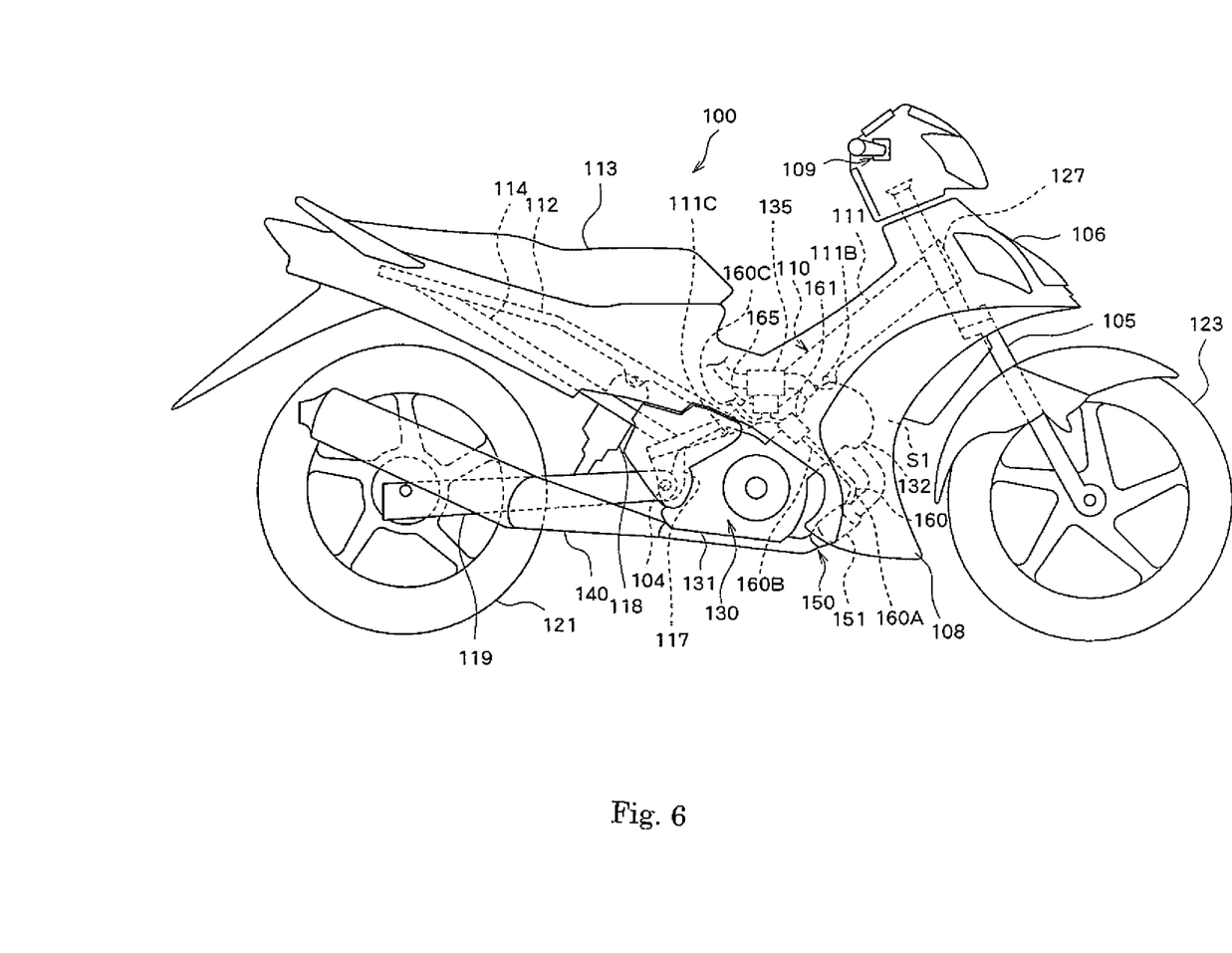
FIG. 6 is a side view of a motorcycle according to a second embodiment of the present invention.
Figure 7:
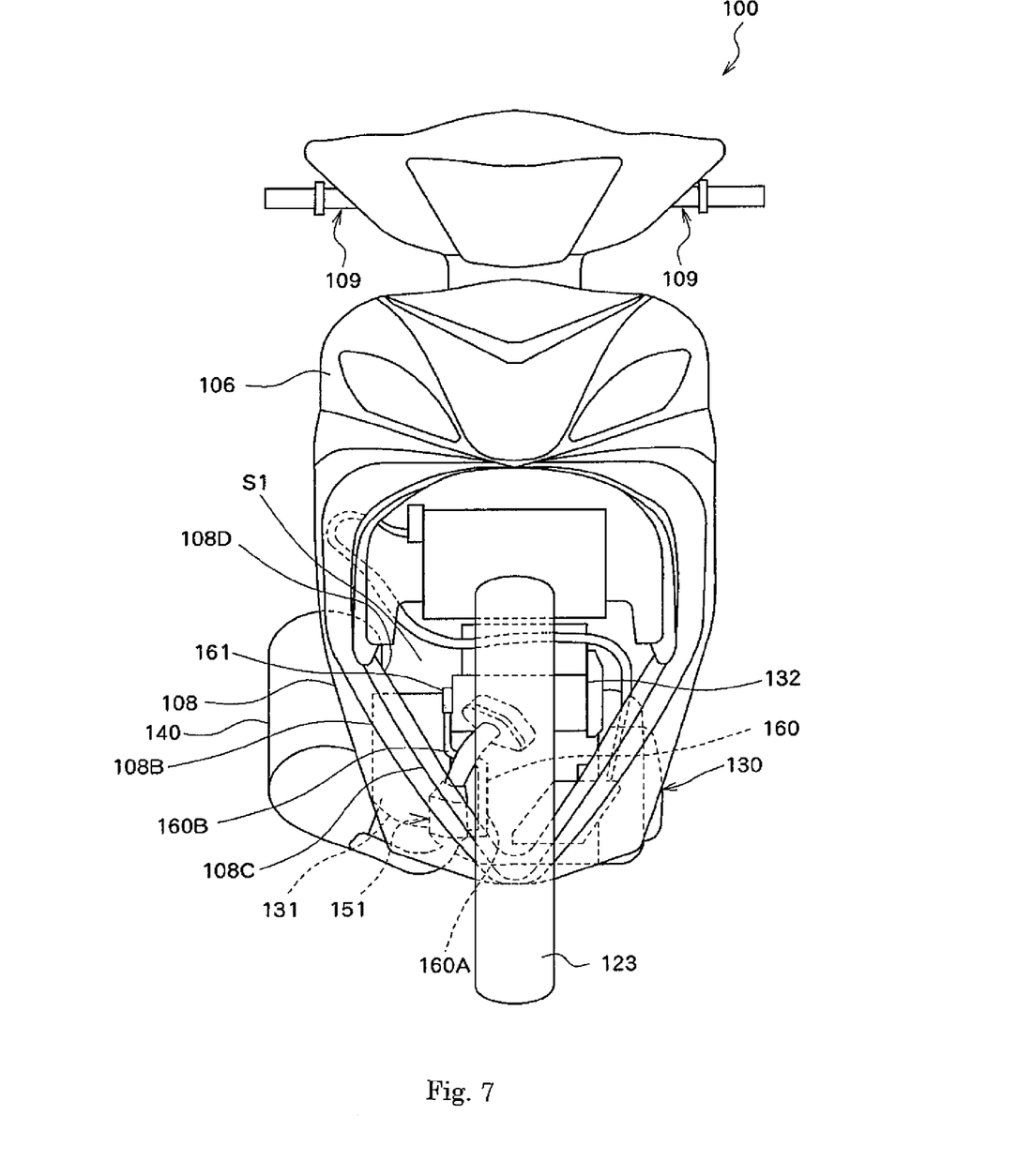
FIG. 7 is a front view of the motorcycle of FIG. 6.
Figure 8:
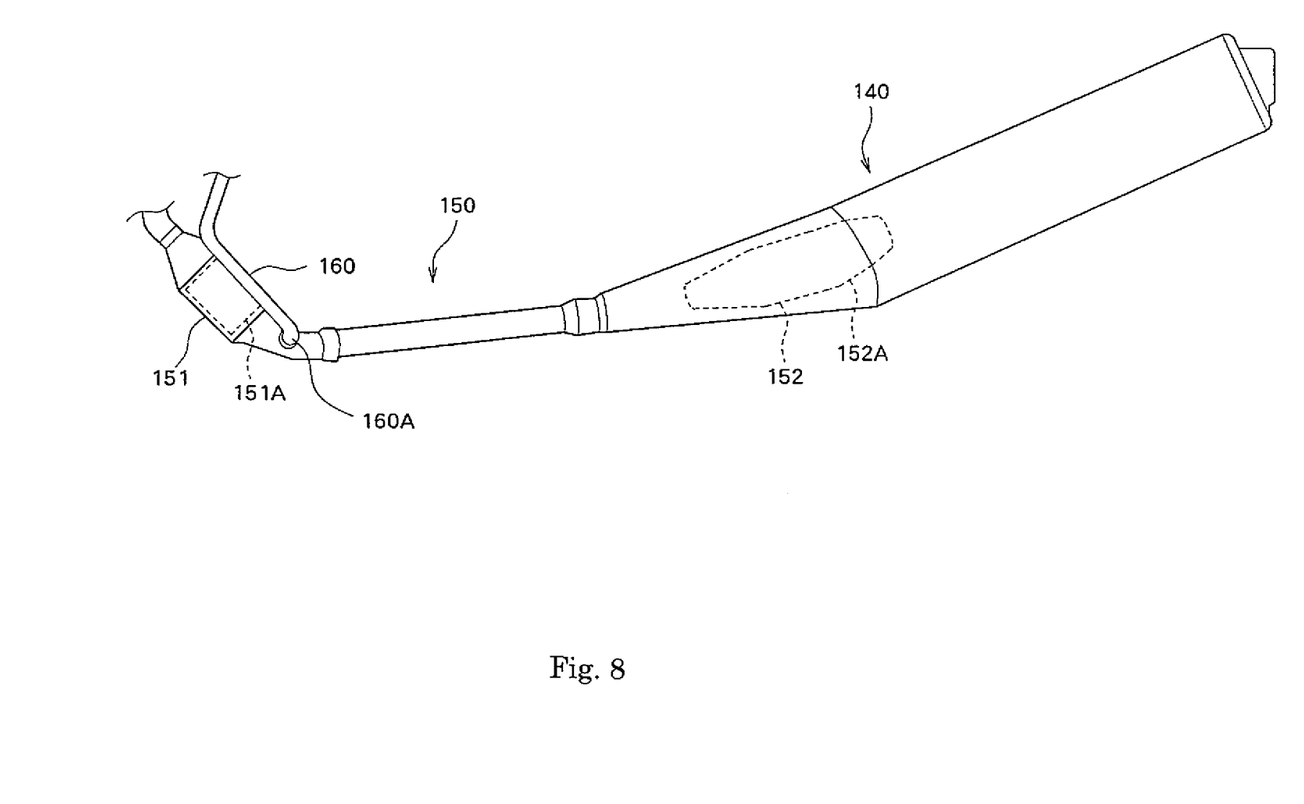
FIG. 8 is a perspective view of the exhaust conduit of the motorcycle of FIG. 6.

FIGS. 6-8 show a second embodiment of the present invention. In FIG. 6, a frame 110 of a motorcycle 100 has a main frame 111. Main frame 111 extends obliquely downward from a front part of motorcycle 100. A head pipe 127 pivotally supporting a front fork 105 is provided at the front end of motorcycle 100. Handlebars 109 are provided at an upper end of front fork 105. A front wheel 123 is pivotally supported at a lower end of front fork 105.

A seat rail 112 extends rearward and obliquely upward from a midway part of main frame 111. A seat 113 is disposed above seat rail 112. A backstay 114 extends rearward and obliquely upward from a rear end of main frame 111, and has a rear end connected to seat rail 112.

A rear arm bracket 117 is mounted on a rear end of main frame 111. An engine 130 is positioned below a rear part of main frame 111 and in a vicinity of the center in the fore to aft direction of motorcycle 100. Engine 130 is suspended by midway parts 111B and 111C of main frame 111, supported by rear arm bracket 117, and fixed to frame 110.

One end of a rear arm 119 is mounted on rear arm bracket 117 via a pivot shaft 104. The other end of rear arm 119 pivotally supports a rear wheel 121. Rear arm 119 and rear wheel 121 are swingable relative to frame 110 with pivot shaft 104 provided on rear arm bracket 117 being a fulcrum. A rear suspension 118 is provided between rear arm 119 and seat rail 112.

Frame 110 is covered by a vehicle cover 106 and a leg shield 108, Leg shield 108 is mounted on a front part of vehicle cover 106. Leg shield 108 opens forward, and has a rectangular shape in a front view (see FIG. 7). Leg shield 108 gradually tapers forward. FIG. 7 shows ridge lines 108B and 108C of leg shield 108.

Engine 130 is a single cylinder four-cycle engine, and includes a crankcase 131 for housing a crankshaft and a transmission, and a cylinder 132 provided on an upper part of crankcase 131 and having a cylinder body inside. An intake port for inducting air and fuel into engine 130 is formed in cylinder 132. A manifold is connected to the intake port. A throttle body 135, in which an injector is provided, is connected to a part upstream of the manifold. A combustion chamber for combusting fuel supplied from the intake port with air is formed inside cylinder 132. Exhaust gas generated by combustion of fuel is discharged outside engine 130 from an exhaust port formed in a front part of cylinder 132.

An exhaust conduit 150 is connected to the exhaust port formed in cylinder 132. Exhaust conduit 150 extends forward and obliquely downward from the exhaust port, and then curves and extends rearward and obliquely downward. Thereafter, exhaust conduit 150 further curves and extends rearward below crankcase 131. A part of exhaust conduit 150 behind crankcase 131 is housed in a silencer 140 disposed on a side of rear wheel 121.

As shown in FIG. 8, a front catalyzer housing part 151 and a rear catalyzer housing part 152 disposed downstream from front catalyzer housing part 151 are provided in exhaust conduit 150. Front catalyzer housing part 151 houses a front catalyzer 151A mainly having a reducing effect. Rear catalyzer housing part 152 houses a rear catalyzer 152A mainly having oxidizing effect.

A secondary air inducting conduit 160 for supplying secondary air for exhaust gas is connected to exhaust conduit 150. A downstream end of secondary air inducting conduit 160 is connected to exhaust conduit 150 forward of crankcase 131 and above a lower surface of crankcase 131.

As shown in FIGS. 6 and 7, secondary air inducting conduit 160 includes a first conduit section 160A extending inward in the vehicle width direction from a connection with front catalyzer housing part 151 and then curving upward; a second conduit section 160B curving upward from first conduit section 160A in a crank shape and connected to a reed valve assembly 161 disposed on a side of engine 130 at its upstream end; and a third conduit section 160C extending rearward from reed valve assembly 161 and connected to an air cleaner (not shown).

Conduit sections 160A and 160B are exposed to a space S1 formed behind front wheel 123, and form a secondary air cooling conduit. As shown in FIG. 7, conduit sections 160A and 160B are visible from the front of motorcycle 100 through an opening end 108D in front of leg shield 108.

An opening is formed on a side surface of third conduit section 160C for connecting reed valve assembly 161 and the air cleaner together. A box-shaped resonator 165 mounted on a lower part of throttle body 135 is connected to the opening. A part of secondary air flowing into exhaust conduit 150 flows from conduit section 160C into resonator 165. Thereby, interference in gasses caused due to pulsation of secondary air is prevented, and air noise is reduced.

According to this embodiment, conduit sections 160A and 160B are exposed to space S1 formed behind front wheel 123. Thus, secondary air inducting conduit 160 is effectively cooled down, and an effect generally the same as in the first embodiment is realized.

Figure 9:
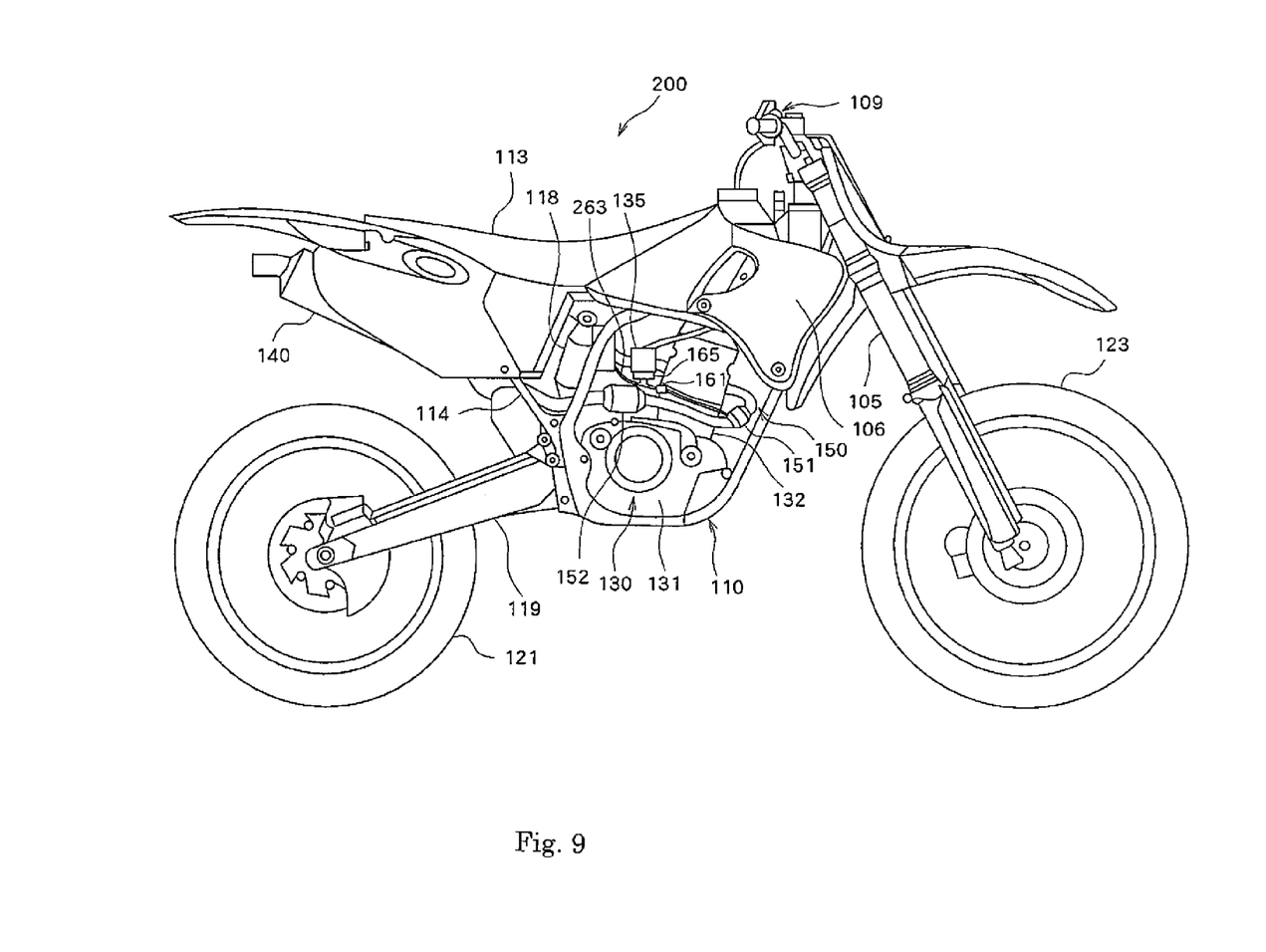
FIG. 9 is a side view of a motorcycle according to a third embodiment of the present invention.

FIG. 9 shows a third embodiment of the present invention. In FIG. 9, the same reference numerals and symbols are given to parts that are the same as in FIGS. 6-8, and detailed descriptions are not repeated. In FIG. 9, an upstream end of a secondary air inducting conduit 263 is connected to a part of an exhaust conduit 150 between a front catalyzer housing part 151 and a rear catalyzer housing part 152. A downstream end of secondary air inducting conduit 263 is connected to an air cleaner (not shown).

Secondary air inducting conduit 263 is exposed to a space on a side of motorcycle 200 behind front wheel 123, and is visible from the side of motorcycle 200.

According to this embodiment, secondary air inducting conduit 263 is exposed to a space on a side of motorcycle 200 behind front wheel 123. Therefore, secondary air inducting conduit 263 is effectively cooled down, and an effect generally the same as in the first embodiment is realized.

In the above embodiments, the engine is described as fixed to the frame. However, the invention is not limited to this construction. It can be applied, for example, to unit swing type vehicles in which an entire engine unit swings together with a rear wheel, such as in many scooters.

Also, the straddle type vehicle has been described as a motorcycle. However, the invention is not limited to motorcycles and can be applied to other straddle type vehicles, for example, three-wheeled motor vehicles, buggies, and so forth.

The particular embodiments of the invention described in this document should be considered illustrative, rather than restrictive. Modification to the described embodiments may be made without departing from the spirit of the invention as defined by the following claims.

The invention claimed is:

1. A straddle type vehicle comprising:
    an engine disposed between a front wheel and a rear wheel, the engine including a crankcase and a cylinder projecting upwardly and forwardly from the crankcase;
    an exhaust conduit including a front catalytic converter and a rear catalytic converter spaced apart in the exhaust conduit; and
    a secondary air inducting conduit including a downstream end connected to the exhaust conduit between the front catalytic converter and the rear catalytic converter; wherein
    the downstream end of the secondary air inducting conduit is located in a space forward of the crankcase, below the cylinder, and behind the front wheel;
    the secondary air inducting conduit includes a reed valve assembly disposed in a middle portion of the secondary air inducting conduit; and
    the secondary air inducting conduit is exposed in a forward direction behind the front wheel.

2. The straddle type vehicle according to claim 1, further comprising an air cleaner, wherein at least a portion of the air cleaner is arranged behind the engine, and an upstream end of the secondary air inducting conduit is connected to the air cleaner.

3. The straddle type vehicle according to claim 1, wherein the secondary air inducting conduit includes a metal pipe.

4. The straddle type vehicle according to claim 1, further comprising a leg shield, wherein the secondary air inducting conduit is visible through an opening in the leg shield.

5. A straddle type vehicle comprising:
    an engine disposed between a front wheel and a rear wheel;
    an exhaust conduit including a front catalytic converter and a rear catalytic converter spaced apart in the exhaust conduit;
    a muffler connected to the exhaust conduit, the front catalytic converter being disposed upstream of the muffler and the rear catalytic converter being disposed within the muffler; and
    a secondary air inducting conduit including a downstream end connected to the exhaust conduit between the front catalytic converter and the rear catalytic converter; wherein
    at least a portion of the secondary air inducting conduit is located forward of a forward-most portion of the engine;
    the secondary air inducting conduit includes a reed valve assembly disposed at a middle portion of the secondary air inducting conduit;
    the secondary air inducting conduit is exposed in a forward direction behind the front wheel; and
    the downstream end of the secondary air inducting conduit is disposed below the engine, and a portion of the secondary air inducting conduit extends in a horizontal direction below the engine.

6. The straddle type vehicle according to claim 5, further comprising an air cleaner, wherein at least a portion of the air cleaner is arranged behind the engine, and an upstream end of the secondary air inducting conduit is connected to the air cleaner.

7. The straddle type vehicle according to claim 5, wherein the secondary air inducting conduit includes a metal pipe.

8. The straddle type vehicle according to claim 5, wherein the secondary air inducting conduit extends from one of the right side and the left side of the vehicle to the other of the right side and the left side of the vehicle and traverses a center of the vehicle.

9. The straddle type vehicle according to claim 8, further comprising right and left body frames, wherein at least a portion of the secondary air inducting conduit overlaps the right and left frames in a side view of the vehicle.

* * * * *